United States Patent Office 3,694,189
Patented Sept. 26, 1972

3,694,189
REDUCTION PROCESS FOR REMOVING IRON FROM SPODUMENE
Charles A. Salotti, 660 Riverhill Drive, Athens, Ga. 30601
No Drawing. Filed Oct. 20, 1969, Ser. No. 867,923
Int. Cl. C22b 27/00; C01d 11/02
U.S. Cl. 75—21                                          3 Claims

ABSTRACT OF THE DISCLOSURE

The process for purifying spodumene by removing iron from the crystal structure comprising heating the spodumene to a temperature in a predetermined range in the presence of a reducing gas under pressure for a predetermined time period so as to convert the iron to its elemental form, in which form it can readily be mechanically, magnetically, or chemically separated from the purified spodumene.

---

The present invention provides a process for removing unwanted iron from the mineral spodumene so as to increase the value of the raw material. The iron is in the crystal structure of the mineral spodumene as a ferric ion in the crystal lattice. In other words, the iron is present as an ion in the chemical composition of the mineral. The iron is therefore referred to as being isomorphously combined with the mineral. U.S. Pat. No. 1,824,807 discloses the process of removing iron from sand and clay by heating in the presence of a reducing gas. However, a satisfactory process for removing isomorphously combined iron has heretofore not been known.

According to the process of this invention the spodumene, which is preferably in a crushed or particulated form, is first heated in air to a temperature sufficient to accomplish a transition of the spodumene from the natural alpha phase to the beta phase. The beta phase spodumene is chemically identical to the alpha phase, the difference being that the beta phase mineral has a more open crystalline structure. Heating of the mineral to a temperature above 900° C. will accomplish this transition. The beta phase spodumene is then placed in a closed chamber from which air has been evacuated. The chamber containing the spodumene is then heated to a temperature, preferably between 700 and 900° C. in the presence of a reducing gas such as hydrogen under a pressure above atmospheric pressure. The heating is continued for a time period which is not critical, but is preferably between ten and forty-five minutes. Because the spodumene is in the beta phase, the reducing gas can much more readily penetrate the crystalline structure and accomplish the desired iron conversion. The reaction products are elemental iron and water. After treatment, the iron is present on the spodumene as readily visible coatings along external crystal surfaces and in fractures. This iron is readily removed mechanically, magnetically, or chemically following procedures well known in the art. Other mineral impurities in the spodumene, such as micas, contain iron in the ferrous or ferric state and this iron is also removed by this process along with the isomorphously combined iron.

Further objects, features and advantages of this invention will become apparent from the following detailed description of examples and the appended claims.

In the following specific examples, the procedure was as follows:

(1) Spodumene of 40–60 mesh particle size which had been heated in air through the alpha–beta transition was loosely contained in platinum foil so that the surrounding atmosphere could readily reach the raw material.

(2) The thus contained beta phase spodumene was placed in a sealed stainless steel vessel connected to a pressure system capable of selectively feeding hydrogen or helium under pressure into the vessel. The vessel was flushed with helium at a pressure of approximately 1000 p.s.i. and then charged with helium so that the helium in the vessel was at a pressure of approximately 1000 p.s.i. and an oxygen free atmosphere was insured.

(3) The vessel was heated until the temperature of the atmosphere therein reached the desired operating temperature, following which the helium was vented and the vessel was flushed with hydrogen to remove the helium.

(4) Hydrogen was pumped into the vessel until the hydrogen pressure therein reached the desired operating pressure. The size of the vessel and the volume of raw material therein were such that a large excess of hydrogen was present in the vessel.

(5) The vessel was maintained at the operating temperature for a predetermined time period hereinafter referred to as "time."

(6) The spodumene was withdrawn from the vessel and analyzed to determine the percent of iron removed.

EXAMPLE I

Temperature (° C.) _____ 400
Pressure (p.s.i.) _____ 100
Time (mins.) _____ 60
Percent Fe removed _____ 29.6

EXAMPLE II

Temperature (° C.) _____ 400
Pressure (p.s.i.) _____ 100
Time (mins.) _____ 10
Percent Fe removed _____ 30.3

EXAMPLE III

Temperature (° C.) _____ 400
Pressure (p.s.i.) _____ 100
Time (mins.) _____ 5
Percent Fe removed _____ 28.4

EXAMPLE IV

Temperature (° C.) _____ 400
Pressure (p.s.i.) _____ 1500
Time (mins.) _____ 10
Percent Fe removed _____ 25.5

EXAMPLE V

Temperature (° C.) _____ 700
Pressure (p.s.i.) _____ 100
Time (mins.) _____ 180
Percent Fe removed _____ 46.5

EXAMPLE VI

Temperature (° C.) _____ 700
Pressure (p.s.i.) _____ 100
Time (mins.) _____ 10
Percent Fe removed _____ 30.8

EXAMPLE VII

Temperature (° C.) _____ 800
Pressure (p.s.i.) _____ 100
Time (mins.) _____ 10
Percent Fe removed _____ 45.4

EXAMPLE VIII

Temperature (° C.) _____ 800
Pressure (p.s.i.) _____ 100
Time (mins.) _____ 20
Percent Fe removed _____ 59.4

EXAMPLE IX

| | |
|---|---|
| Temperature (° C.) | 900 |
| Pressure (p.s.i.) | 100 |
| Time (mins.) | 10 |
| Percent Fe removed | 78.8 |

From the above description and the foregoing examples it is seen that the method of this invention provides a relatively simple process for enabling the easy removal of iron from spodumene so as to improve the value of the raw mineral. It can be seen that temperature and time are the controlling factors in the process, with the time required at the higher temperatures to obtain high percentage of iron removal being relatively short in any event. The magnitude of the reducing gas pressure is not significant so long as the pressure is adequate for a sufficiently high hydrogen to water pressure ratio to insure adequate reduction of the iron to its elemental form. With sufficient gas volume, a pressure above atmospheric pressure, such as a pressure on the order of 50 p.s.i. is adequate, and for the above reasons a temperature in the range of 700–1200° C. is preferred for a time period of several minutes. In the above examples, the pressure vessel was flushed with helium, but it should be understood that the flushing step could be omitted or when flushing is desired any chemically inert gas can be substituted for helium.

Having thus described my invention, I claim:

1. A process for purifying spodumene by converting deleterious ferric ions contained in the crystal structure thereof to readily removable elemental iron, the steps comprising:

(a) heating said spodumene in air to a temperature sufficient to insure that substantially all of said spodumene is transformed to the beta phase, (b) heating said spodumene in a closed chamber to a temperature between 700° C. and 900° C. in the presence of hydrogen under a pressure above atmospheric, and (c) removing the resulting elemental iron from the spodumene.

2. A process as set forth in claim 1 wherein said spodumene is particulated prior to beta phase transformation step a.

3. A process as set forth in claim 1 wherein heating step b is continued for a period of time ranging between 5 and 180 minutes.

References Cited

UNITED STATES PATENTS

| | | | |
|---|---|---|---|
| 2,413,644 | 12/1946 | Nicholson | 23—26 X |
| 2,726,138 | 12/1955 | Cunningham | 23—31 |
| 3,032,389 | 5/1962 | Frevel et al. | 23—26 X |
| 1,789,813 | 1/1931 | Gaus | 75—1 |
| 3,087,782 | 4/1963 | Whaley | 23—27 X |
| 2,181,094 | 11/1939 | Ness | 75—66 X |
| 2,408,748 | 10/1946 | Alexander | 75—66 X |
| 3,105,755 | 10/1963 | Green | 75—21 X |

FOREIGN PATENTS

| | | | |
|---|---|---|---|
| 1,184,307 | 1959 | France | 75—66 |
| 1,321,476 | 1963 | France | 75—66 |

HENRY W. TARRING II, Primary Examiner

U.S. Cl. XR

75—66; 23—26, 27